Patented Feb. 6, 1951

2,540,236

UNITED STATES PATENT OFFICE 2,540,236

CRYSTALLINE SULFAQUINOXALINE AND ACETONE AND ITS PRODUCTION

Ralph H. Beutel, Newark, and John A. Elder, Jr., Plainfield, N. J., assignors to Merck & Co., Inc., Rahway, N. J., a corporation of New Jersey No Drawing. Application September 3, 1948, Serial No. 47,756

3 Claims. (Cl. 260—239.65)

This invention relates to the preparation of new and therapeutically useful products and, more particularly, to new crystalline forms of sodium sulfaquinoxaline adapted for use in tablets and other pharmaceutical preparations.

The sodium salt of sulfaquinoxaline, a physiologically active product useful in the treatment of infections is ordinarily not suited for the preparation of tablets, and the like.

In the preparation of sodium sulfaquinoxaline, sodium hydroxide is reacted with sulfaquinoxaline, i. e. 2-sulfanilamido quinoxaline, the preparation of which is disclosed in "Journal American Chemical Soc." 66, 1957 (1944). The resulting slurry is then usually agitated until the compounds are completely dissolved. This aqueous solution is then dried by any conventional method such as spray-drying whereby an amorphous hygroscopic dark yellow powder is formed. This amorphous product, sodium sulfaquinoxaline is deliquescent at room temperature and under general conditions a deliquescent material is undesirable for use in the preparation of tablets. Tablets prepared with amorphous sodium quinoxaline disintegrate after a short exposure to atmospheric conditions.

It has been proposed to isolate sodium sulfaquinoxaline in crystalline form from aqueous solution by the use of conventional methods. These attempts, however, were entirely unsuccessful due to the extreme solubility of sodium sulfaquinoxaline in water. Attempts to concentrate the aqueous solution of sodium sulfaquinoxaline usually resulted in a thick, sticky mass which is very difficult to handle on a large scale operation.

We have now found that it is possible to convert the amorphous sodium sulfaquinoxaline to crystalline products characterized as containing, as solvent of crystallization water or an oxygenated organic solvent such as acetone, alcohols, ketones, dioxane, and the like, and which are highly stable at ordinary atmospheric conditions.

The crystalline form of sodium sulfaquinoxaline containing firmly bound solvent prepared from the amorphous form can be converted to the crystalline form containing water of crystallization. Alternatively, crystalline sodium quinoxaline containing firmly bound water can be repared directly from the amorphous form.

In carrying out the new process in accordance with our invention herein disclosed, the amorphous sodium sulfaquinoxaline prepared by reacting sodium hydroxide with sulfaquinoxaline is first subjected to spray-drying, or any other conventional drying method. The resulting amorphous sodium sulfaquinoxaline is then added to an oxygenated organic solvent such as acetone, ethanol, dioxane, or the like, and the reaction mass is agitated vigorously. The resulting slurry is then agitated for several hours whereupon a crystalline sodium sulfaquinoxaline is formed which can be removed by filtration or other suitable method. The crystalline product contains a large proportion of solvent so firmly bound, that heating for 36 hours at 140° C. is required to evaporate the solvent. This crystalline compound exhibits unusual stability under atmospheric conditions and is well suited for the manufacture of tablets.

In accordance with another adaptation of our invention, it is possible to prepare a crystalline compound directly from amorphous sodium sulfaquinoxaline. When amorphous sodium sulfaquinoxaline is exposed to high humidity conditions such as 75% or higher, of relative humidity, an initial deliquescence takes place after which the product begins to dry, forming a crystalline compound. Analysis of the new crystalline compound reveals an increase in weight of about 13%, firmly bound water and a definite crystalline structure under X-ray diffraction.

The crystalline compound containing firmly bound solvent can be converted to the crystalline compound containing water of crystallization. This is accomplished by exposing crystalline sodium sulfaquinoxaline containing solvent, to 90% relative humidity for several days. The formed crystalline compound loses some weight and is found on analysis to be a crystalline compound containing firmly bound water. X-ray diffraction showed definite crystalline structure identical with the crystalline compound formed directly by exposing amorphous sodium sulfaquinoxaline to high humidity.

The following examples illustrate methods of carrying out the present invention, but it is to be understood that these examples are given by way of illustration and not of limitation.

Example 1

31.5 pounds of sulfaquinoxaline was added slowly with stirring to 11.2 gallons of water and stirring continued until a thick uniform slurry was obtained. A sodium hydroxide solution prepared by dissolving 1930 gm. (4.25 lbs.) of sodium hydroxide pellets in 1870 cc. (0.5 gal.) water, was added slowly to the slurry. Stirring was continued until solution was complete after which 600 gms. (1.3 lbs.) of activated carbon was added and the solution stirred at room temperature for one hour. The carbon was removed by filtration.

The sodium salt solution was spray-dried at the rate of 85 cc. per minute. The inlet air temperature was maintained at 475–500° C. and the outlet temperature at 150–175° F. The spray-dried salt is an amorphous, hygroscopic, dark yellow powder.

26.7 pounds of the amorphous spray-dried sodium salt was sprinkled on the surface of 15 gallons of acetone under vigorous agitation in a 50 gallon kettle. The resulting slurry was stirred for two hours at room temperature and then filtered. The product obtained is a light yellow crystalline salt. The crystalline product, sodium sulfaquinoxaline, so obtained contains about 13% acetone.

*Example 2*

A suspension of 30 g. of spray-dried sodium sulfaquinoxaline in 100 cc. of benzene is heated to 70–80° C. and under very vigorous stirring, 7.2 g. of water is added. A very stiff paste is obtained which gradually crystallized on continued heating and stirring. The product was filtered, washed with benzene, and dried at 50° C. The compound containing water, was found by X-ray diffraction to have a crystalline structure.

*Example 3*

A sample of 0.8 g. of the amorphous spray-dried sodium sulfaquinoxaline was exposed to 75% relative humidity for 3 days. The sample partially deliquesced and then dried forming a crystalline compound. The compound had increased 13.2% in weight and showed definite crystalline structure under X-ray diffraction.

*Example 4*

A crystalline sample of 0.7 g. of sodium sulfaquinoxaline containing acetone was exposed to 93% relative humidity for 3 days. At the end of the period the sample had lost 1.4% in weight and in X-ray diffraction showed definite crystalline structure identical with the structure of the compound described in Example 3, but different from the crystalline structure of the crystalline compound prepared in accordance with the solvent method of Example 1.

Modifications may be made in carrying out the present invention without departing from the spirit and scope thereof and the invention is to be limited only by the appended claims.

We claim:

1. Crystalline sodium sulfaquinoxaline containing firmly bound acetone.

2. The process that comprises mixing amorphous sodium sulfaquinoxaline with a quantity of acetone to form a slurry, thoroughly agitating the slurry and filtering the resulting mixture to separate a crystalline substance consisting of sodium sulfaquinoxaline containing firmly bound acetone.

3. The process that comprises adding a quantity of amorphous sodium sulfaquinoxaline with vigorous agitation to an amount of acetone sufficient to form a slurry, continuing agitation of said slurry for about 2 hours and then filtering to recover a crystalline substance consisting of sodium sulfaquinoxaline containing firmly bound acetone.

RALPH H. BEUTEL.
JOHN A. ELDER, Jr.

REFERENCES CITED

The following references are of record in the file of this patent:

UNITED STATES PATENTS

| Number | Name | Date |
|---|---|---|
| 2,135,553 | Anderson | Nov. 8, 1938 |
| 2,303,698 | Karasch et al. | Dec. 1, 1942 |
| 2,371,115 | Winnek et al. | Nov. 6, 1945 |
| 2,404,199 | Weijlard et al. | July 16, 1946 |

FOREIGN PATENTS

| Number | Country | Date |
|---|---|---|
| 114,894 | Australia | Apr. 2, 1942 |

OTHER REFERENCES

Scudi, J. Biol. Chem., vol. 156 (1944), pp. 343–348.

Stevens et al., J. Amer. Chem. Soc., vol. 68 (1946), pp. 1035–1039.

Ser. No. 334,990, Foldi et al. (A. P. C.), published Apr. 20, 1943.